United States Patent

[11] 3,622,038

| [72] | Inventor | Fred R. Wilhelm |
| | | Avon Lake, Ohio |
| [21] | Appl. No. | 842,658 |
| [22] | Filed | July 17, 1969 |
| [45] | Patented | Nov. 23, 1971 |
| [73] | Assignee | Airborne Mfg. Co. |
| | | Cleveland, Ohio |

[54] SEALED VESSEL
10 Claims, 9 Drawing Figs.

[52] U.S. Cl. .................................. 220/82 R,
220/46 R, 220/42 B, 73/431, 220/60 R
[51] Int. Cl. .................................. B65d 25/54,
B65d 53/00
[50] Field of Search.......................... 220/82, 60,
46, 24.5, 42 B; 73/431, 416; 229/1.5 B, 43;
215/52, 51; 152/.5; 240/7.1, 152

[56] References Cited
UNITED STATES PATENTS

| 2,581,734 | 1/1952 | Triplett .................. | 220/82 X |
| 2,688,995 | 9/1954 | Wagoner ................. | 220/60 UX |
| 2,830,722 | 5/1958 | Darmstadt ............... | 215/52 X |
| 3,388,600 | 6/1958 | Gorgens et al. .......... | 220/82 X |
| 3,460,711 | 8/1969 | Al-Roy ................... | 229/43 X |

Primary Examiner—Raphael H. Schwartz
Attorney—Bosworth, Sessions, Herrstrom and Cain ABSTRACT: A vessel such as an instrument case, for example, having an opening for access to the interior of the vessel and a closure for the opening adapted to have stressed self-sealing engagement with each other augmented by pressure differentials across the seal to close the vessel against differences in internal and external pressure.

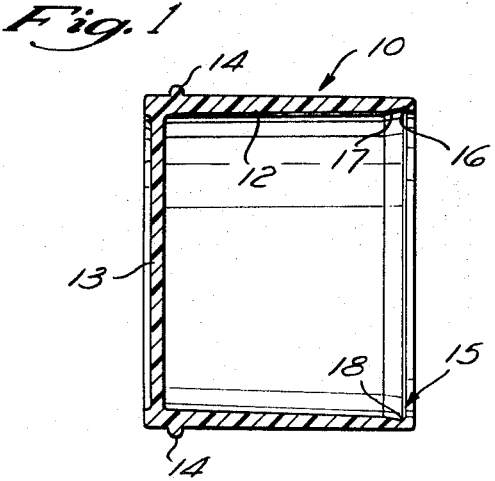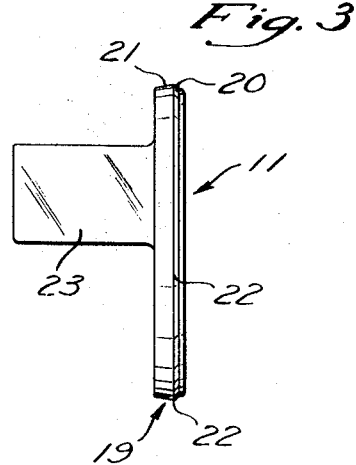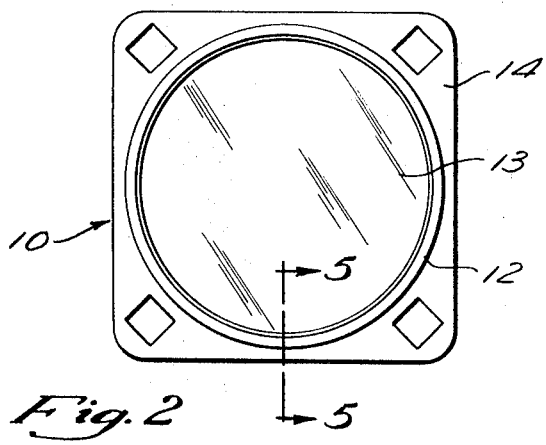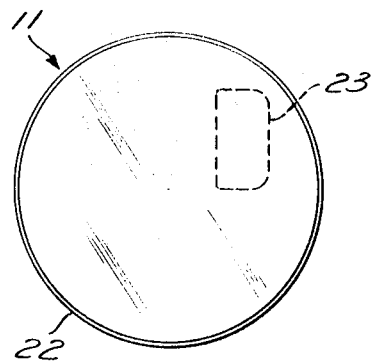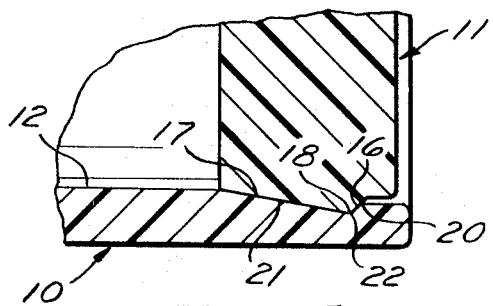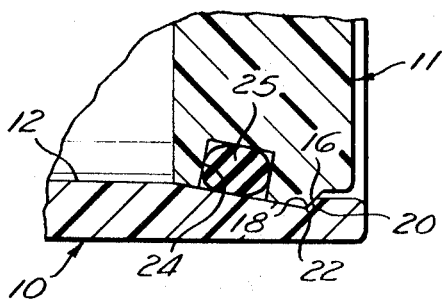
INVENTOR.
FRED R. WILHELM
BY Bosworth, Sessions,
Hometown of Cain
ATTORNEYS

INVENTOR.
FRED R. WILHELM

SEALED VESSEL

BRIEF SUMMARY OF THE INVENTION

This invention is directed to the problem of providing a pressure and vacuumtight vessel or case made up of two cooperating parts which fit together in stressed self-sealing engagement without the usual seal elements. The invention finds utility, for example, in the embodiment of a case for a gauge or instrument. The invention is described in detail below in the embodiment of a vacuum gauge for aircraft vacuum instrument systems; albeit, the invention is not limited to such an embodiment nor to any particular use of a sealed case.

Broadly, the invention comprises a sealed vessel made up of a case having a circular opening and a closure for it. Relative to the closure, the case is flexible and elastically yieldable. The opening is provided with an internal double-tapered annular groove and the closure with a corresponding external double-tapered edge. The double tapers each comprises a pair of axially contiguous annular surfaces inclined to their axis of revolution equal or unequal amounts and in opposite directions. The crest of the external edge is of greater diameter than the root diameter of the internal groove so that the case must yield elastically and is enlarged diametrically when the closure is positioned in the circular opening. The double-tapered groove and edge of the case and closure are thus stressed into self-sealing engagement independently of any pressure differential across the seal. The relatively flexible character of the case with respect to the closure permits the case to easily and effectively conform to the contour of the closure edge and insures a continuous seal.

The stress developed in the case when applied to the double-taper configuration of the groove and edge tends to load axially more or less and one or the other of the pairs of mating tapers in accordance with the magnitude and direction of the pressure differential being sustained. Since the case and groove surround the closure edge, the sealing surfaces are urged into even tighter engagement than provided alone by stressing the case when the external pressure exceeds the internal pressure.

The inclination of the tapers making up the groove and edge are preferably unequal. A long, low-angle entry taper on the closure edge aids in snapping the relatively oversize closure into the mating groove of the elastically yieldable case. Although the surfaces of such lesser tapers are axially loaded to provide the desired sealing engagement, they are still able to provide satisfactory resistance to axial displacement of the end closure into the case when sustaining a vacuum aided by external pressure which augments the forces resulting from the stressed engagement of the mating groove and edge.

The other groove and edge tapers, nearer the outer end of the case opening, are preferably inclined to the axis at an angle several times the angle of inclination of the entrance taper. A steeper taper increases the resistance of the closure to blow out from the case when the case is pressurized. In this condition, of course, the pressure differential tends to diminish the sealing forces developed by elastic deformation of the case. The internal pressurization, however, axially loads the closure urging the steeper taper surfaces into tighter engagement than would be present at less steep tapers.

Thus, the novel arrangement comprehended by this invention of an annular double-tapered groove and circular edge stressed in self-sealing engagement provides a single case design and construction having equal utility as a vacuum and a pressure vessel.

BRIEF DESCRIPTION OF THE DRAWINGS

FIG. 1 is a side elevational view in full cross section of the case portion of a preferred embodiment of the invention;

FIG. 2 is an end elevation view of the case portion shown in FIG. 1;

FIG. 3 is a side elevation view in full cross section of the end closure portion of a preferred embodiment of the invention adapted for cooperative sealing engagement with the case of FIGS. 1 and 2;

FIG. 4 is an end elevation view of the end closure shown in FIG. 3;

FIG. 5 is a partial view in enlarged scale of the case and end closure of FIGS. 1–4 shown in sealing engagement and sectioned in the radial plane 5—5 n FIG. 2;

FIG. 6 is a partial view similar in viewpoint, scale, and sectioning to that of FIG. 5, but showing a modified form of end closure in sealing engagement with the case;

DETAILED DESCRIPTION OF A PREFERRED EMBODIMENT

Figure 7:
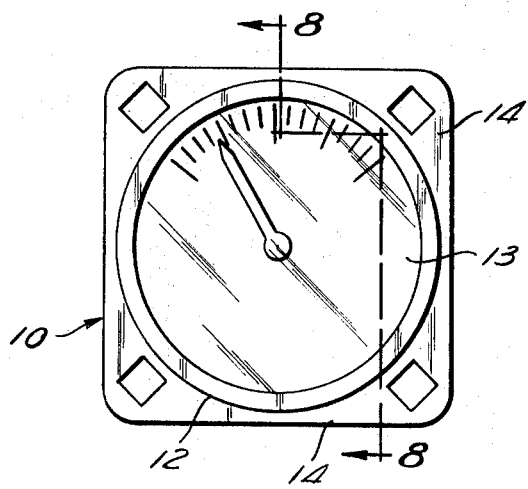
FIG. 7 is an elevation view of the window end of the sealed vessel containing an instrument mechanism and showing the face of the instrument.

The invention is disclosed here in the embodiment of a sealed instrument or gauge case. The case is equally effective when used at internal pressures greater than and less than external pressures. Indeed, one of the important advantages of the invention is its universal utility with respect to pressure embodied in the simplest constructions.

The embodiment shown comprises only two major parts; a cylindrical case indicated generally at 10 and an end closure indicated generally at 11.

Case 10 is made up of a cylindrical sidewall 12 closed at one end by integral end wall 13 and open at the opposite end. Case 10 accommodates, for example, a vacuum gauge mechanism requiring a sealed vessel or container. It also may accommodate a manifold pressure gauge requiring a sealed vessel or container. See FIGS. 7–9. These two examples are intended to illustrate only and not to limit the scope, applicability and utility of the invention.

Case 10 is preferably provided adjacent end wall 13 with a mounting flange 14 having mounting holes at a standard panel spacing. Case 10 with an instrument is normally mounted for use with end wall 13 facing outward from the panel. End wall 13 is clear and acts as a cover glass for the face of the instrument within the case as well as an integral part of the pressure sealed vessel.

Case 10 is preferably made of thermoplastic polycarbonate resins marketed, for example, by General Electric Co. under the trademark "Lexan." Any material possessing a combination of toughness, impact strength, heat resistance, dimensional stability and sufficient clarity when molded to serve as a cover glass would be equally satisfactory.

Cylindrical sidewall 12 is relatively thin so that it has a noticeable degree of flexibility. End wall 13 stiffens the closed end of the cylindrical case 10, but the sidewall 12 is flexible enough that it can be elastically deformed from its normally circular configuration by squeezing it between the thumb and fingers. As will be described in detail below, cylindrical sidewall 12 also permits elastic enlargement of its circumference. Such elastic yieldability of case 10 and its cylindrical sidewall 12 contributes to the advantageous results achieved by the invention.

End closure 11 is a thickened disc also preferably composed of polycarbonate resins such as Lexan. Closure 11 is thick enough or otherwise designed and dimensioned to have substantial rigidity relative to the flexibility of cylindrical sidewall 12 of case 10. Closure 11 is also resistant to change in its circumferential dimensions relative to cylindrical sidewall 12 at the open end of case 10.

The open end of case 10 and end closure 11 are adapted as now described in detail to have self-sealing stressed engagement with each other to provide a case sealed against internal pressure higher and lower than external pressure. Adjacent its open end, case 10 is provided an internal annular groove indicated generally at 15 and formed by two axially juxtaposed tapering sidewalls 16 and 17 which meet and join at the root 18 or bottom of groove 15. Sidewall taper 16 is nearer the open end and sidewall taper 17 is nearer the closed end of case 10. Groove 15 as constituted above is characterized as a double-tapered groove in the description that follows and in the claims.

The periphery of end closure 11 is provided with an external double-tapered edge indicated generally at 19 and corresponding to and adapted to mate with double-tapered groove 15 in case 10. Edge 19 comprises two annular tapering surfaces 20 and 21 axially juxtaposed and joined at a circular crest 22. Annular tapering surfaces 20 and 21 of edge 19 and annular tapering sidewalls 16 and 17, respectively, of groove 15 are adapted to correspond and to have substantial surface engagement with each other.

A contributing factor to the advantageous result achieved by this invention is the difference in diameters of the internal annular groove 15 of case 10 and the external annular edge 19 of end closure 11. The diameter of crest 22 of annular edge 19 is slightly greater than the root diameter of annular groove 15. In a case having a 2-inch internal diameter, for example, differences in root and crest diameters of the order of 0.002 of an inch have been used successfully. When end closure 11 and case 10 are assembled with double-tapered edge 19 sealingly engaged in annular groove 15 to form a joint as shown in FIG. 5, for example, the open end portion of sidewall 12 is enlarged circumferentially and resiliently stressed by such a difference in the diameters of the crest 22 and root 18 of the cooperating edge and groove, respectively. The root and crest are preferably rounded to a small radius to reduce any binding between the mating parts that would otherwise tend to interfere with the resilient urging of the parts into sealing engagement. The rounding also tends to prevent engagement of the groove 15 and edge 19 at only their root 18 and crest 22, respectively. In the 2-inch case referred to above, a 0.005-inch radius works well.

In order to assemble the case and end closure into a sealed vessel, it is convenient to have the least diameter of the tapered surface 21 less than the least diameter of tapered sidewall 16 of groove 15. This permits end closure 11 to be placed against the open end of case 10 and pressed into place. The open end portion of cylindrical sidewall 12 is enlarged diametrically and elastically stressed as taper 21 is axially displaced past the least diameter of the entrance taper 16 of groove 15. When crest 22 passes this point of least diameter, the edge of end closure 11 snaps into place in groove 15 of case 10 as shown, for example, in FIG. 5. Crest 22 of edge 19 fits into root 18 of groove 15 with tapers 16 and 17 of the groove in engagement with tapers 20 and 21, respectively, of edge 19.

During assembly, circular sidewall 12 is enlarged in the region of groove 15 a maximum amount as crest 22 of double-tapered edge 19 passes by the least diameter of entrance taper 16 of the internal groove of the case. When end closure 11 is in place, the enlargement of sidewall 12 decreases to that required by the difference in root and crest diameters described above. Sidewall 12 must, therefore, accommodate diametrical overenlargement in assembly beyond that necessary during the assembled life of the vessel.

The resultant enlargement upon assembly produces the resilient stress which urges the double-tapered surfaces into mating sealing engagement. The stress is directed generally radially of the parts, and, when acting on the tapered surfaces, tends to load axially the parts on one or the other of the two engaged pairs of tapers. The relative difference between the internal and external pressures in and about the assembled vessel determines which of the double tapers is loaded to the point of sealing engagement. When a vacuum is present in the case, tapers 17 and 21 are sealingly engaged. They are urged together both by the resilient stress set up in sidewall 12 and by the excess of external pressure pressing sidewall 12 radially against the peripheral edge 19 of end closure 11.

The angle of taper with respect to the axis of case 10 and end closure 11 is preferably different for the two tapers of groove 15 and edge 19. As most easily seen in FIG. 5, mating pairs of tapers 16 and 20 are inclined at a substantially greater angle to the axis of the sealed vessel than are mating tapers 17 and 21. This difference contributes several advantages to the invention.

The lesser entering taper 21 on edge 19 provides a mechanical advantage or force multiplication when enlarging the diameter of the open end portion of sidewall 12 as the parts are assembled. This advantageous lesser taper is well able to resist "blow-in" of the end closure because, the sidewall 12 and end closure 11 and, thus, tapers 17 and 21 are urged together more tightly by the pressure difference across them.

Tapers 16 and 20 are preferably inclined to advantage a greater amount than tapers 17 and 21. Tapers 16 and 20 are in pressure-sealing engagement when the sealed vessel is pressurized. Internal pressure tends to diametrically enlarge case 10 and "blow-out" end closure 11 and does not help to urge the sealing surfaces into engagement. The steep inclination increases resistance to blow out for the same reasons the lesser inclination of tapers 17 and 21 aids the enlargement of the case during assembly of the end closure in it.

Further control of the seal achieved between the engaged surfaces of the case and end closure can be achieved by providing an included angle between tapers 16 and 17 of groove 15 when case 10 is unstressed by closure 11 that is slightly different from the included angle between tapers 20 and 21 of edge 19. Preferably, the included angle between the tapers of groove 15 is slightly greater than the included angle of the tapers of edge 19. This accommodates any change in the included angle of the groove walls that may result from its diametrical enlargement by installation of the end closure. The amount of the difference preferably is such that sufficiently large areas of engagement between groove 15 and edge 19 result when the case 10 is stressed by assembly with closure 11 to provide the desired sealing ability. The optimum difference in the included angles will depend upon the properties of the materials used, the sizes involved, and the operating conditions experienced.

In the 2-inch diameter instrument case previously referred to, a lesser taper of about 10° and a steeper taper of about 45° have been used to successfully seal the case against both internal pressure and vacuum. The 10° tapers seal when external pressure exceeds internal pressure and the 45° tapers seal when the internal pressure exceeds the external pressure. Any difference in the included angles of the tapers of groove 15 and edge 19 provided to achieve the measure of control mentioned above is usually small and such that normally the double tapers of the groove and the edge may be said to correspond.

Figure 8:
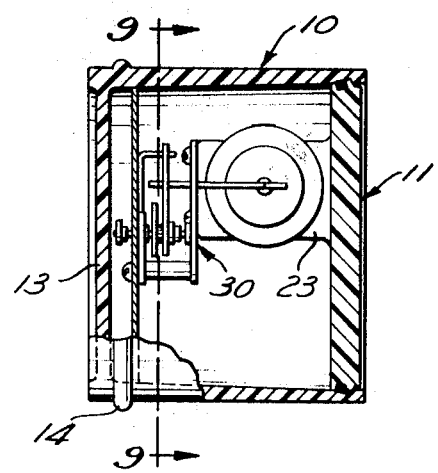
FIG. 8 is a side elevation view in full cross section of the vessel and instrument mechanism mounted therein and shown in FIG. 7, taken in the plane of line 8—8 in FIG. 7.
Figure 9:
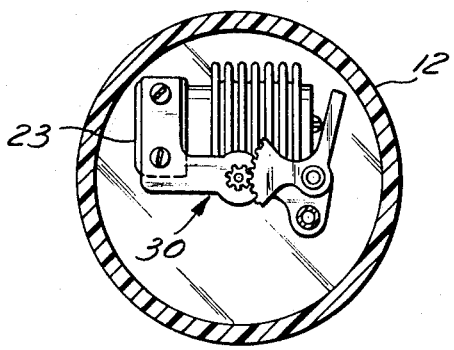
FIG. 9 is an elevation in full cross section of the vessel and instrument mechanism mounted therein and shown in FIG. 7, taken in the plane of line 9—9 in FIG. 8.

In the instrument case embodiment shown in FIGS. 7-9 of the invention described above, the works 30 of the instrument are conveniently mounted on stems, pedestals, or other structural elements fastened to the end closure. The structural mounting projection 23 on end closure 11 in FIGS. 3 and 8 is an example of such an element. When so mounted, the instrument mechanism 30 is supported in a fixed position within the vessel when the end closure and case are assembled. See FIGS. 7-9. Connection to the instrument mechanism can be made through appropriate openings through the end closure by means of conventional coupling arrangements.

Disassembly of the sealed vessel can be accomplished by axially and radially loading the end closure at one point on its periphery. This tends to tip the end closure in the open end of the case about a diametrical axis. The open end of the cylindrical sidewall tends to be elastically deformed to permit this.

A modified form of the double-tapered joint described above is shown in FIG. 6. This joint involves an annular groove 24 in the taper 21 of the edge 19 of end closure 11. The groove may be square bottomed as shown. An O-ring 25 is carried in the groove. When the end closure with O-ring and case are assembled, the O-ring provides some additional sealing or resistance to leakage into or out of the sealed vessel. This function of the O-ring is conventional and not essential to the enjoyment of the invention. The O-ring does contribute a unique and useful function, however, in the embodiment shown. The O-ring tends to prevent relative rotation of case 10 and end closure 11. Since the instrument mechanism is mounted on and supported by the end closure and the case normally has a fixed orientation in a panel, relative rotation would result in undesirable movement and disorientation of the instrument face in the window of the case. Also, connections to the instrument through the end closure could become twisted, stretched, broken, or otherwise adversely affected if the end closure were to rotate. Although the double-tapered seal without the O-ring has been successfully employed in some instrument cases without experiencing any adverse relative rotation of the case and end closure, the modification utilizing an O-ring will prevent this movement and its deleterious results in those embodiments of the invention in which it may otherwise occur.

An optional feature not shown in the forms of the invention illustrated in the drawings is an annular shoulder provided on the axially inner side of the groove inside the case. This acts as a positive stop to prevent the inadvertent insertion of the closure too far into the case. Such a misassembly could damage the contents of the case and/or stretch the walls of the case beyond their elastic limits.

Those skilled in the art will appreciate that various other changes and modifications can be made in the preferred form of apparatus described herein without departing from the spirit and scope of the invention.

I claim:

1. A vessel comprising a cylindrical case having an open circular end and a circular wall adapted to have self-sealing stressed engagement with said cylindrical case to seal the vessel against internal pressure higher and lower than external pressure, said circular wall being substantially rigid relative to said cylindrical case and said cylindrical case being flexible and elastically yieldable circumferentially relative to said circular wall, said case having an internal double-tapered annular groove adjacent its open end and said circular wall having an external double-tapered circular edge corresponding to said groove, said groove having a root diameter and said edge having a crest diameter larger than the root diameter of said groove, whereby said case is stressed in circumferentially directed tension and said circular wall is stressed in radially directed compression when the edge of said end wall is fitted into the groove of said case to produce self-sealing engagement of tapered surfaces of said groove and said edge.

2. The vessel according to claim 1 in which the two tapers comprising the double-tapered annular groove are inclined at different angles with respect to the axis of the groove.

3. The vessel according to claim 2 in which that taper of the double-tapered annular groove nearer the open end of the case is inclined at a substantially greater angle with respect to the axis of the groove than the other taper of the groove.

4. The vessel according to claim 3 in which the angle of inclination of the taper of the double-tapered annular groove nearer the open end of the case with respect to the axis of the groove is inclined at an angle at least three times the angle of inclination of the other taper.

5. The vessel according to claim 2 in which the least diameter of the taper of said groove nearer the open end of the case is greater than the least diameter of the less inclined taper of said edge.

6. The vessel according to claim 1 in which the crest diameter of the double-tapered edge exceeds the root diameter of the double-tapered groove by at least 0.002 inch.

7. The vessel according to claim 1 in combination with an instrument mechanism having an instrument face and adapted for operation in a sealed vessel, and in which said case has a transparent window for revealing the face of said instrument when sealed in the vessel and in which said circular closure wall is provided with the sole structural means for mounting the instrument mechanism thereon and for supporting and positioning the mechanism within the case and with the instrument face in the window of the case, all when the case and wall are assembled as a pressure vessel.

8. The vessel according to claim 1 together with means for inhibiting relative rotational movement of said case and said circular wall comprising an annular groove in one of the mating tapers of the double-tapered groove and edge, and a resilient O-ring positioned in said annular groove to have engagement with the tapered surface mating with the tapered surface carrying said O-ring.

9. The vessel according to claim 8 in which the O-ring and annular groove containing it are on a taper of lesser inclination of the double-tapered groove and edge.

10. The vessel according to claim 8 in combination with an instrument mechanism having an instrument face and adapted for operation in a sealed vessel, and in which said case has a transparent window for revealing the face of said instrument when sealed in the vessel and in which said circular closure wall is provided with means for mounting the instrument mechanism thereon and for supporting and positioning the mechanism within the case and with the instrument face in the window of the case, all when the case and wall are assembled as a pressure vessel.

* * * * *